(12) United States Patent
Larimore et al.

(10) Patent No.: US 7,281,360 B1
(45) Date of Patent: Oct. 16, 2007

(54) THERMAL LAMINATES AND LAMINATING METHOD OF FOOD PACKAGING FILMS

(75) Inventors: Paul E. Larimore, Horn Lake, MS (US); Bradley A. Kramer, Cordova, TN (US); Billy W. Crockett, Jr., Senatobia, MS (US)

(73) Assignee: Bryce Corporation, Memphis, TN (US)

( * ) Notice: Subject to any disclaimer, the term of this patent is extended or adjusted under 35 U.S.C. 154(b) by 178 days.

(21) Appl. No.: 11/056,923

(22) Filed: Feb. 11, 2005

(51) Int. Cl.
*B65B 5/02* (2006.01)

(52) U.S. Cl. ........................................ 53/452; 156/384

(58) Field of Classification Search ................ 428/201, 428/203, 349; 53/452–459; 156/384
See application file for complete search history.

(56) References Cited

U.S. PATENT DOCUMENTS

| | | | |
|---|---|---|---|
| 4,215,176 A | 7/1980 | Tuller | |
| 4,333,968 A * | 6/1982 | Nahmias | 427/173 |
| 4,410,595 A | 10/1983 | Matsumoto | |
| 4,657,610 A | 4/1987 | Komatsu | |
| 4,769,175 A | 9/1988 | Inoue | |
| 4,927,690 A | 5/1990 | Welsh | |
| 4,965,136 A | 10/1990 | Mueller | |
| 5,126,198 A * | 6/1992 | Schinkel et al. | 428/349 |
| 5,410,857 A * | 5/1995 | Utley | 53/410 |
| 5,674,600 A | 10/1997 | Hargarter | |
| 5,786,092 A | 7/1998 | Lorenzo | |
| 5,976,651 A | 11/1999 | Tatsumi | |
| 6,013,353 A * | 1/2000 | Touhsaent | 426/203 |
| 6,125,614 A * | 10/2000 | Jones et al. | 53/461 |
| 6,153,298 A | 11/2000 | Joson | |
| 6,503,587 B2 | 1/2003 | Kashiba | |
| 6,511,688 B2 * | 1/2003 | Edwards et al. | 426/130 |
| 6,543,507 B2 * | 4/2003 | Lien | 156/384 |
| 6,613,430 B2 | 9/2003 | Culbertson | |
| 6,663,974 B2 | 12/2003 | Kelch | |
| 6,726,969 B1 * | 4/2004 | Balaji et al. | 428/35.7 |
| 6,756,095 B2 * | 6/2004 | Sandt et al. | 428/40.1 |
| 2002/0050319 A1 * | 5/2002 | Nishizawa et al. | 156/245 |
| 2004/0157040 A1 | 8/2004 | Ackerman | |
| 2004/0170851 A1 | 9/2004 | Lischefski | |
| 2004/0208911 A1 * | 10/2004 | Ratnakumar et al. | 424/443 |

FOREIGN PATENT DOCUMENTS

JP 2002-356658 * 12/2002

* cited by examiner

*Primary Examiner*—D. Lawrence Tarazano
(74) *Attorney, Agent, or Firm*—Luedeka, Neely & Graham, P.C.

(57) ABSTRACT

The specification discloses a method for forming a packaging film. According to the method, a packaging film base layer is provided having a first side and a second side and formed from polymeric materials. At least one additional layer of polymeric material is extrusion coated onto the first side of the base layer. A heat sealable layer is applied onto the second side of the base layer. The method also includes providing a packaging film outer layer having a first side and a second side and formed from polymeric materials. At least one of the outer layer first and second sides is capable of being printed thereon and selected packaging information is printed onto at least one side of the outer layer. Preferably, the outer layer is reverse printed on its second side. Finally, the method includes thermally laminating the base layer and outer layer to one another using a combination of heat and pressure. A packaging film and a method for packaging food products with the film are also disclosed.

13 Claims, 4 Drawing Sheets

THERMAL LAMINATES AND LAMINATING METHOD OF FOOD PACKAGING FILMS

FIELD OF THE INVENTION

The invention relates to laminated packaging films and, in particular, to a thermally laminated packaging film, suitable for food packaging, and a method for making the same.

BACKGROUND OF THE INVENTION

Packaging films for food products can be as simple as a mono-layer film or multiple layers joined together with various lamination methods. Packaging films for food products are often formed from multi-layered polymeric laminates. These polymeric laminates are typically joined by adhesive, extrusion or co-extrusion of the various polymeric layers of the laminate. Extrusion, and particularly coextrusion, manufacturing processes have found commercial favor because they lend themselves to cost-efficient, high-speed production of large quantities of laminates.

However, extrusion and coextrusion processes do require substantial time for initial setup and for changeovers from one production run to another. Changing the lamination process conditions, equipment and purging raw materials contribute to the set up and change over time. Given these downtime issues, extrusion lamination is less efficient for the manufacture of comparatively small batches of laminate products.

What is needed therefore is an improved method for joining of layers to create small batches of films, such as packaging films, which provides greater flexibility in production of small runs of multi-layered laminations while still providing many of the efficiency benefits of high-speed adhesive or extrusion lamination techniques and meeting end-product packaging requirements.

SUMMARY OF THE INVENTION

With regard to the foregoing, the present invention provides a method for forming a food packaging film. According to the method, a packaging film base layer is provided having a first side and a second side and formed from polymeric materials. A heat sealable layer is provided on the second side of the base layer. At least one layer of polymeric material is extrusion coated onto the first side of the base layer to provide an extrusion coating thereon. The method also includes providing a packaging film outer layer having a first side and a second side and formed from polymeric materials. At least one of the outer layer first and second sides is capable of being printed thereon and selected printing information is provided on at least a portion of at least one side of the outer layer. Preferably, the outer layer is reverse printed on its second side. Finally, the method includes thermally laminating the extrusion coating on the base layer to the outer layer using a combination of heat and pressure.

In certain embodiments of the invention, the extrusion coating step may be carried out by coextrusion of multiple coating layers onto the first side of the base layer, at least the layer thereof closest to the outer layer comprising an ethylene vinyl acetate copolymer having a relatively low melting point in the range of from about 70° C. to about 150° C.

In certain embodiments of the invention, it is generally preferred to treat the first side of the base layer, prior to the extrusion coating step, with a surface treatment selected from the group consisting of corona discharge treatment, plasma treatment, flame treatment, and chemical treatment.

In general, it is preferred that the base layer and the outer layer are thermally laminated using a nip formed from at least two laminating rolls in rotating contact with one another. At least one of the laminating rolls is heated to a temperature to at least 180° F. The thermal lamination is preferred carried out with a nip pressure of at least 50 pounds per square inch (psi).

The method preferably also includes preheating the extrusion coating on the base layer immediately prior to the thermal lamination step. In the thermal lamination step itself, the heat is preferably directed to flow from the heat sealable layer toward the extrusion coating so that the extrusion coating forms a bond with the outer layer.

With regard to materials, in certain embodiments of the invention, the polymeric material of the base layer preferably comprises at least one polymer selected from the group consisting of polypropylene, polyethylene terephthalate, polyethylene, and nylon. More preferably, the base layer comprises at least biaxially oriented polypropylene. The first side of the base layer may also be provided with a metal coating or barrier coating such as polyvinylidene chloride, aluminum oxide and silica dioxide on its first side in order to provide a moisture and oxygen barrier for food packaging.

Similarly, in certain embodiments of the invention, the polymeric material of the outer layer preferably comprises at least one polymer selected from the group consisting of polypropylene, polyethylene terephthalate, polyethylene, and nylon. More preferably, the outer layer comprises at least biaxially oriented polypropylene.

The extrusion coating preferably comprises at least ethylene vinyl acetate copolymer.

The base layer film generally has a thickness of from about 8 microns to about 30 microns and preferably has a thickness of from about 18 microns to about 23 microns. In certain embodiments of the invention, the base layer is preferably metallized. Further, the base layer may contain opacifiers.

The outer layer film generally has a thickness of from about 8 microns to about 30 microns and preferably has a thickness of from about 18 microns to about 23 microns. In certain embodiments of the invention, the outer layer preferably includes an opacifier. However, in certain other embodiments of the invention, the outer layer is preferably a substantially clear layer.

In another aspect, the present invention provides a method for forming a packaged food product. According to the method, a food packaging film is first provided. The food packaging film is formed by providing a packaging film base layer having a first side and a second side and formed from polymeric materials. A heat sealable layer is provided on the second side of the base layer. At least one additional layer of polymeric material is extrusion coated onto the first side of the base layer. The method also includes providing a packaging film outer layer having a first side and a second side and formed from polymeric materials. At least one of the outer layer first and second sides is capable of being printed thereon and selected packaging information is provided on at least one side of the outer layer. The food packaging film is provided by thermally laminating the base layer and outer layer to one another using a combination of heat and pressure.

A consumable food product is then provided. The film is folded lengthwise sealed together along and adjacent first and second edges thereof with material from the heat sealable layer contacting itself therealong so as to form an open ended, tube-like enclosure. The food product is inserted into the tube-like enclosure. Finally, opposite ends of the enclosure are sealed together along and adjacent third, fourth, fifth, and sixth edges of the film with material from the heat sealable layer contacting itself therealong so as to seal the food product within the enclosure. Preferably the third and fourth edges are sealed together before the food product is inserted into the enclosure.

In still another aspect, the present invention provides a thermal laminate packaging film. The film includes a packaging film base layer having a first side and a second side and formed from polymeric materials and at least one layer of polymeric extrudate adjacent the first side of the base layer, the extrudate having a relatively low melting point in the range of from about 70° C. to about 150° C. at lest in the area of the layer defining its surface opposite the surface adjacent the base layer and the extrudate also providing a barrier to egress of food components through the film. The film also includes a heat sealable layer adjacent the second side of the base layer and a packaging film outer layer having a first side and a second side and formed from polymeric materials, wherein at least one of the outer layer first and second sides has selected packaging information printed thereon and wherein the outer layer second side is thermally laminated to the layer of polymeric extrudate using a combination of heat and pressure. The film preferably has a bond strength of at least about 300 grams per inch.

In certain embodiments, the extrusion coating comprises at least a coextrudate with a first layer comprising an ethylene vinyl acetate copolymer adjacent the outer layer with a melting point ranging from about 70° C. to about 150° and a second layer comprising a low density polyethylene adjacent the base layer. More preferably, the first layer comprises about 40% by weight of the coextrudate and the second layer comprises about 60% by weight of the coextrudate. It is also preferred that the second layer has a melt index of about 7.

Advantageously, the method of the invention allows for greater flexibility in the production of relatively small quantities of printed packaging films. A common packaging film base layer, suitable for use in a variety of packaging films, may be rapidly produced in large quantities by an extrusion coating process. A smaller amount of packaging film outer layer may then be printed with a unique set of graphics and/or information for each individual packaging film. The uniquely printed outer layer may then be readily joined to a portion of the common base layer by thermal lamination. In this manner, the inventive method offers the greater flexibility of thermal lamination techniques compared to extrusion on adhesive lamination changeover time and costs related to small quantity production.

BRIEF DESCRIPTION OF THE DRAWINGS

The above and other aspects and advantages of the invention will now be further described in conjunction with the accompanying drawings in which.

DETAILED DESCRIPTION OF THE INVENTION

The invention involves a thermally laminated packaging film and a method for manufacturing such film.

Figure 1:
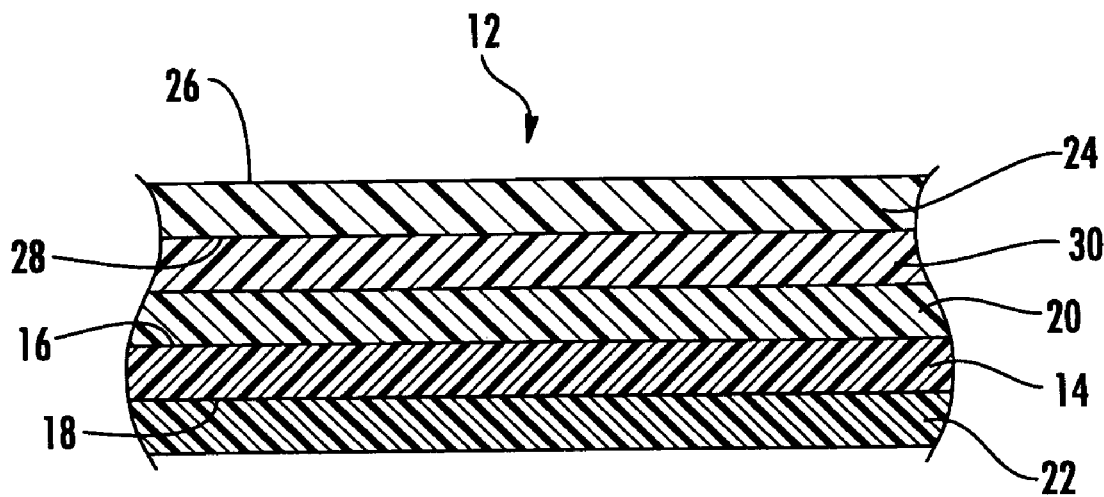
FIG. 1 is an enlarged cross-sectional view of a food packaging film according to one embodiment of the present invention.

Referring now to the drawings, various aspects of one embodiment of the invention will now be described with reference to FIG. 1 wherein a cross section of the thermally laminated film 12 of the invention is depicted. The packaging film 12 includes a polymeric packaging film base layer 14 having a first side 16 and a second side 18. The packaging film base layer 14 has at least one layer of polymeric extrudate 20 on its first side 16. This film also has a relatively thin thermally sealable layer 22 on side 18. The packaging film 12 also includes a packaging film outer layer 24 having a first side 26 and a second side 28 and formed from a polymeric material. At least one of the outer layer first and second sides 26,28 may have selected packaging information 30 printed thereon. In the packaging film 12 of the invention, the outer layer second side 28 is thermally laminated to the layer of polymeric extrudate 20 using a combination of heat and pressure such that the total composite of layers is suitable as a food packaging film for food.

Generally, the polymeric material of the base layer 14 comprises at least one polymer selected from the group consisting of polypropylene, polyethylene terephthalate (PET), polyethylene and nylon. More preferably, the base layer 14 comprises at least biaxially oriented polypropylene (BOPP). The polymer of the base layer 14 may also be metallized or coated with barrier materials such as polyvinylidene chloride, aluminum oxide, and silica dioxide. Base layer 14 may also contain opacifiers if desired in order to provide a specific appearance and to provide moisture and oxygen barrier properties to the final packaging film 12. Additionally, opacifiers or other fillers or additives to change opacity could be added to the extrusion coating 20. If desired, the first side 16 of the base layer 14 may also be provided with a metal coating or a barrier coating such as polyvinylidene chloride, aluminum oxide, or silica dioxide in order to provide moisture and/or oxygen barrier properties.

Dimensionally, the base layer film 14 generally has a caliper or thickness of from about 8 microns to about 30 microns and preferably has a thickness of from about 18 microns to about 23 microns. The basis weight of the base layer 14 may range from about 60,000 to about 25,000 square inches per pound, and is preferably from about 44,000 to about 34,000 square inches per pound.

An extrusion coating layer 20 is applied to the first side 16 of the base layer film 14. The extrusion coating material is selected so as to provide tackiness and good adhesion when the base layer and outer layer films 14, 24 are thermally laminated together as described herein. The extrusion coating material preferably comprises a low temperature melting resin with a melt point range of about 70° to 150° C. such as ethylene vinyl acetate copolymer or low density polyethylene. More preferably, the extrusion coating layer 20 may comprise two or more coextrudated layers of polymer. For instance, the extrusion coating layer may include an inner coating layer in contact with first side 16 formed from a low density polyethylene (LDPE) with melt index of about seven. This inner coating layer can be clear or contain opacifiers. The extrusion coating layer 20 may also include an outer extrusion coating layer formed from an ethylene vinyl acetate (EVA) copolymer having about 16%, by weight, vinyl acetate.

It has been found that higher EVA percentages may cause blocking due to the high tackiness of the surface. Higher melt index levels of the low density polyethylene can result in stringing phenomena when cutting the finished food packaging film 12. Preferably, the coextruded low density polyethylene layer provides about 60% by weight of thickness of the extrusion coating 20 and the ethylene vinyl acetate copolymer provides about 40%.

The base layer 14 first side 16 may be pre-treated via corona, flame, plasma or chemical treatment techniques in order to improve the bonding of the extrusion coating to the base layer.

The extrusion coating layer 20 is generally applied to the base layer first side 16 at a thickness of from about 12 to 24 microns and preferably at a thickness of from about 18 microns to about 20 microns. The basis weight of the extrusion coating 20 is generally from about 11.4 to about 22.8 grams per square meter and is preferably from about 14.6 to about 16.3 grams per square meter.

On the second side 18 of the base layer 14 there may be applied a heat sealable skin layer 22. The heat sealable layer 22 is applied to the base layer second side 18 by extrusion and, if desired, the heat sealable layer 22 may in fact be extruded prior to extrusion coating 20.

The packaging film 12 also includes an outer layer film 24. Similarly to the base layer 14, the packaging film outer layer 24 is formed from a polymeric material which comprises at least one polymer selected from the group consisting of polypropylene, polyethylene terephthalate (PET), polyethylene and nylon. More preferably, the outer layer 24 comprises at least biaxially oriented polypropylene (BOPP). Outer film 24 may also include an opacifier but it is generally preferred to use a substantially clear out film.

The outer layer film 24 generally has a thickness or thickness of from about 8 microns to about 30 microns and preferably has a thickness of from about 18 microns to about 23 microns. The basis weight of the outer layer 24 is generally from about 60,000 to about 25,000 square inches per pound and is more preferably from about 44,000 to about 34,000 square inches per pound.

The outer film 24 has first and second sides 26, 28 and one or both of the first and second sides 26,28 may be printed with a layer of selected packaging information 30 such as promotional graphics or other product information pertaining to the food product which is ultimately to be packaged using the film 12. Preferably the outer layer 24 is printed on its second side 28 using the reverse printing technique. Thus the printing is essentially embedded within the final laminate of the packaging film 12 and thereby better protected from scratching and other marring.

As noted above, the printed outer layer film 24 is thermally laminated to the extrusion coating 20 on base layer 14. Importantly, the thermal lamination process is carried out at a temperature so as to not affect the thin thermally sealable layer 22. The chosen thermal lamination temperature also does not adversely affect the performance of the optional metal or barrier coating if on side 16.

The packaging film 12 of the invention may be manufactured by first providing the packaging film base layer 14 and applying a relatively thin het sealable skin layer 22 to the second side 18 of the base layer 14. This is preferably done by an extrusion lamination process. Suitable base layers having a heat sealable skin already extruded thereon are available from Exxon Mobile of Macedon, N.Y. under the trade name "HB" (metallized film), from Applied Extrusion Technologies and Wilmington, Del. under the trade name "AQS" (clear film), or from BPX Films of Houston, Tex. under the trade name "PXDAS-RM" (opaque, metallized film). The next step is applying the extrusion coating material 20 to the first side 16 of base layer 14. An extruder and die design configured for single or multiple extrusion coating layers are utilized. A suitable extruder system is available from Davis Standard Company of Pawcatuck, Conn.

For the extrusion coating step, low density polyethylene is generally heated to a temperature of from about 550° to about 620° F. Ethylene vinyl acetate copolymer is generally heated to a temperature of from about 440° to about 460° F. prior to extrusion.

The extrudate charges are then coextruded through an extruder die and passed through a nip between a set of rolls allowing the base layer film 14 to contact the extrusion coating 20 thereon. At least one of the rolls is preferably chilled so as to expedite cooling and solidification of the extrudates. The nip pressure utilized in forming the coextrudate is generally from about 40 to about 60 pounds per square inch in order to provide a coextrudate of polyethylene and ethylene vinyl acetate copolymer having an overall thickness of from about 14.6 to about 16.3 grams per square meter.

Figure 2:
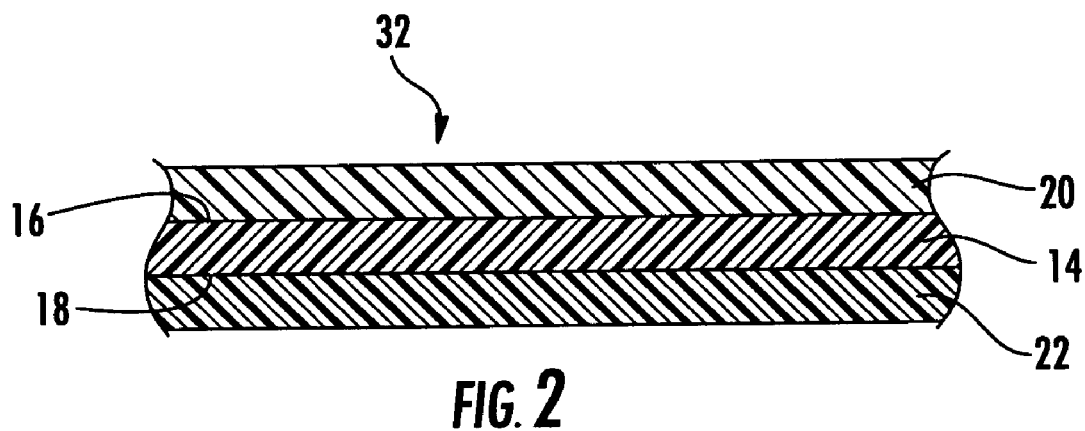
FIG. 2 is an enlarged cross-sectional view of a base layer for use in making a food packaging film according to one embodiment of the present invention.

Application of the heat sealable layer leads to a partially formed packaging film 32 as shown in FIG. 2. This partially formed packaging film 32, comprising the base film, together with its first side extrusion coating 20 and its second side heat sealable layer 22, may be wound up and collected on a windup reel for storage. Then, when needed, all or a portion of the film 34 may be thermally laminated to a printed outer film to form the final packaging film 12. Importantly, different portions of the same base film material may be thermally laminated to two or more outer films having different packaging information printed thereon. Thus, a "common" base film may be utilized in several different final packaging films.

To complete the overall packaging film 12, the outer film layer 24 is next provided, preferably as a pre-formed film of oriented polypropylene. A suitable film is available from Exxon Mobil of Macedon, N.Y. or from BPX Films of Houston, Tex. under the trade name EXWI-T.

The outer film layer 24 is then printed with selected packaging information 30 on either the outer film first side 26, or second side 28, or on both sides. The outer film 24 is preferably printed on its second side 28, i.e., reverse printed. Suitable inks for use in printing the desired packaging information are known in the art and include water and solvent-based inks. For instance, suitable inks may be obtained from Sun Chemical of Northlake, Ill. If desired, the surface of the outer film 24 may be pre-treated by corona, plasma, flame and chemical treatment techniques to improve the adhesion of the printing ink to the film surface.

The printing of the outer layer 24 may be carried out using commercially available printing apparatus such as a 8-color press available from Windmöeller & Hoelscher Corporation of Lincoln, R.I. under the brand name Starflex. Using such a printing apparatus, printing speeds of up to 2000 ft/minute may be achieved.

Figure 3:
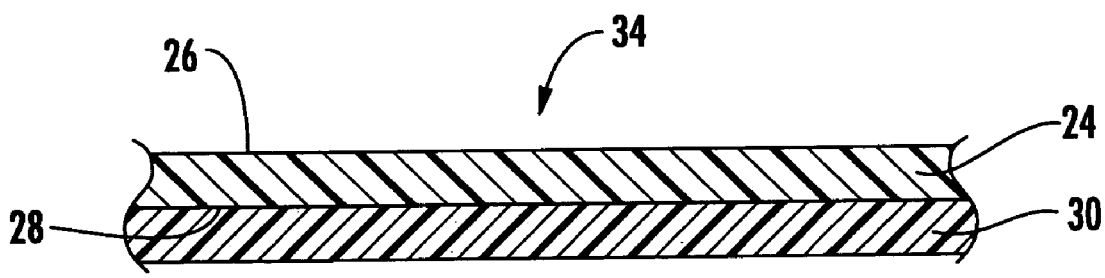
FIG. 3 is an enlarged cross-sectional view of a outer layer for use in making a food packaging film according to one embodiment of the present invention.

A cross section of the printed outer layer 34 is depicted schematically in FIG. 3.

The packaging film 12 is completed by thermally laminating the printed outer layer film 34 to the extrusion coated first side 16 of the base layer film 14. In order to improve the bonding achieved during thermal lamination, either the extrusion coating and/or the second side of the outer layer film may be pre-treated such as by plasma, corona, flame and/or chemical treatment.

Figure 4:
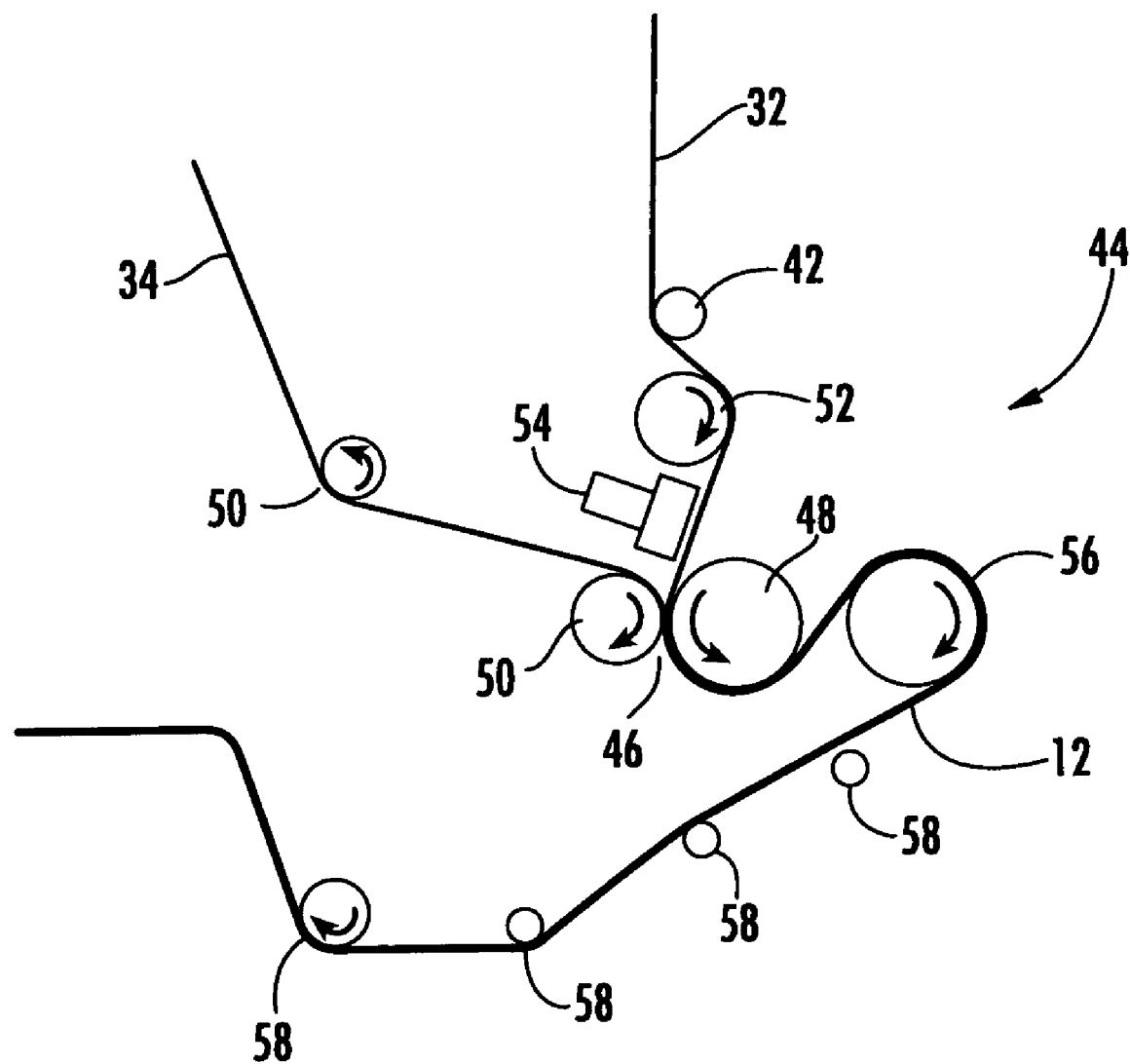
FIG. 4 is a schematic depiction of a portion of a thermal lamination process for forming a food packaging film according to the present invention.

The printed outer film 34 and the extrusion coated base film 32 are fed from a set of unwind stations (not shown) and directed by one or more idle rolls 40,42 into a thermal lamination station such as shown in FIG. 4. In order to provide good bonding, the thermal laminator 44 is preferably operated at speed of from about 200 to about 600 feet per minute, with the printed outer film 34 and extrusion coated base film 32 being fed from the unwind stations at comparable rates.

As shown in FIG. 4, the printed outer film 34 and the extrusion coated base film 32 are thermally laminated by being passed through a nip 46 formed by a first, heated roll 48 and a second, non-heated roll 50. The extrusion coated base film 32 passes through the nip 46 adjacent to the heated roll 48 so that the extrusion coating is sufficiently heated to soften layer 20 and to laminate the films 32, 34 together. When used with an extrusion coating comprising ethylene vinyl acetate copolymer, the heated roll 48 is preferably set at a temperature of from about 200° to about 250° F.

If needed, additional heated rolls 52 or other heater elements 54 may be utilized to pre-heat the extrusion coated base film 32 prior to passage of the film through the nip 46.

After passing through the nip 46, the combined films are preferably directed over one or more chill rolls 56 in order to cool and re-solidify the extrusion coating 20 thereby completing the thermal lamination. The chill roll temperature is preferably maintained at a temperature less than 100° F. to solidify the extrusion coating. The finished thermally laminated packaging film 12 is then generally directed over a series of idle rolls 58 before being collected at a windup station (not shown).

Figure 5:
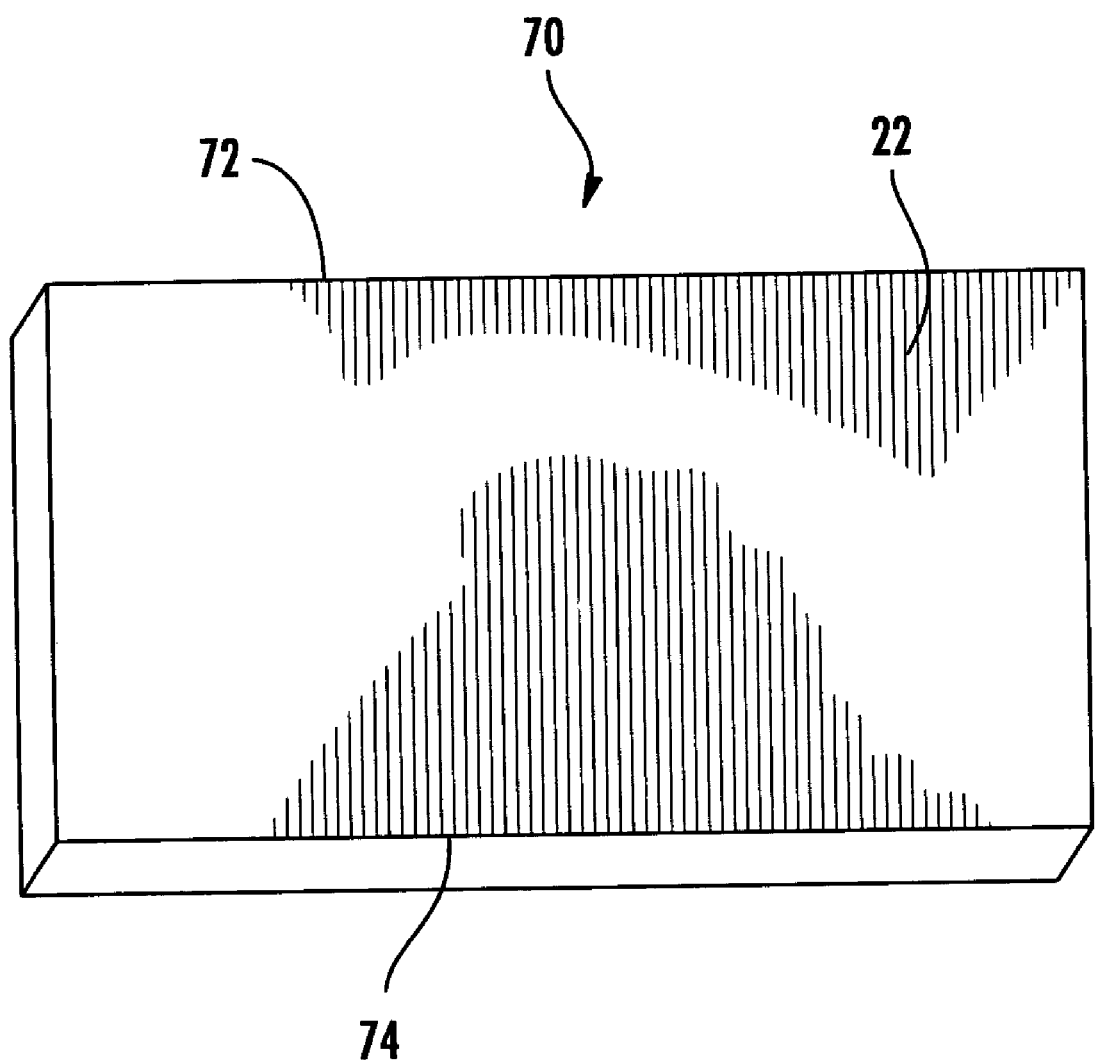
FIG. 5 is a diagrammatic top elevational view of a food packaging pouch made according to one embodiment of the invention.

The aforementioned packaging film may be advantageously used for food packaging. According to the invention, a portion of the packaging film is formed and cut to provide a blank for a generally rectangular food packaging pouch 70 as shown in FIG. 5. The blank pouch 70 so provided has first and second generally parallel edges 72, 74.

Figure 6:
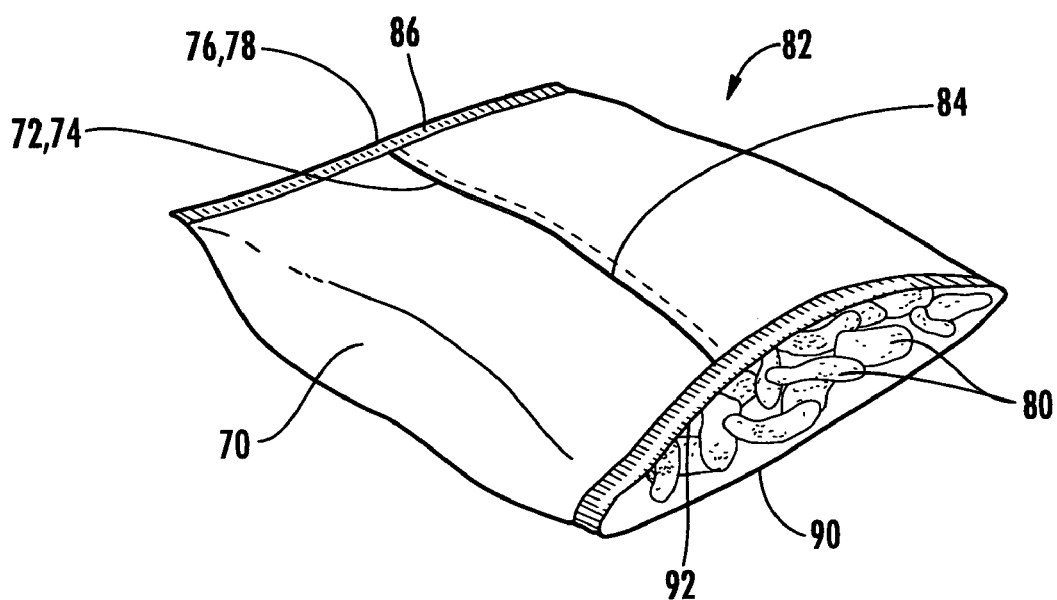
FIG. 6 is a diagrammatic perspective view of a partially completed food package made from a food packaging film made according to one embodiment of the present invention.
Figure 7:
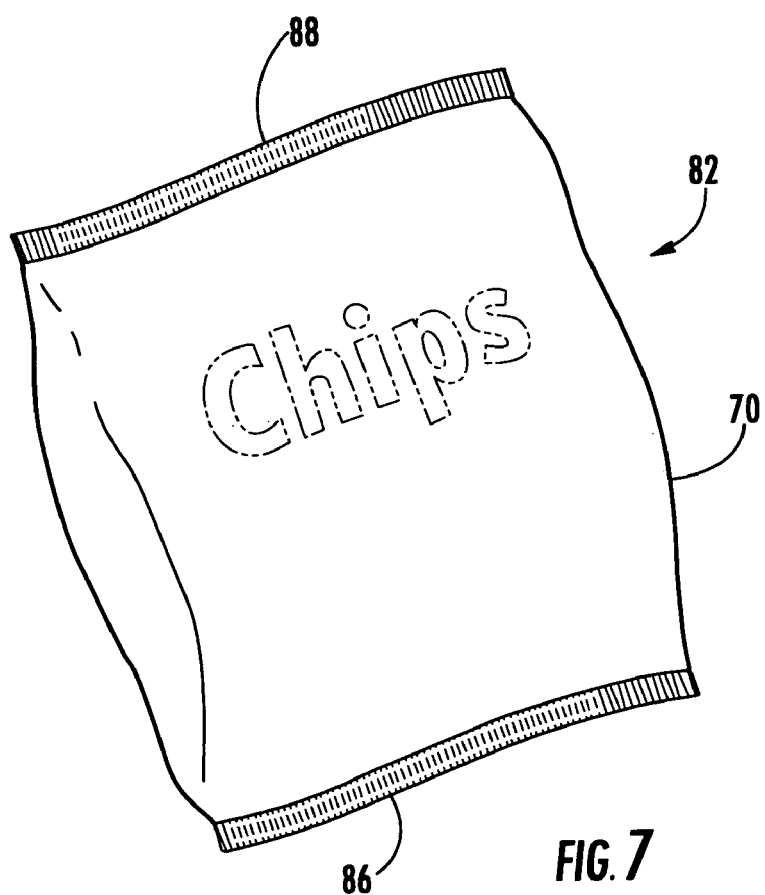
FIG. 7 is a diagrammatic perspective view of a completed food package made form a food packaging film made according to one embodiment of the present invention.

The pouch 70 is folded so as to join via overlapping along the first and second edges 72,74. The first and second edges 72, 74 of the pouch 70 are then sealed along a longitudinal seam 84 with the heat sealable layer underneath the seam 84 to form a tube-like sleeve having two open ends corresponding to its third and fourth edges 76, 78 and fifth and sixth edges 90, 92. The third and fourth edges 76, 78 of the pouch 70 are then sealed to one another along first horizontal seam 86 using the heat sealable layer underneath the seam 86 to provide a package having one opening for food insertion and an internal cavity for storage of a food product 80. This cavity may be filled with food as shown in FIG. 6. Lastly, the final fifth and sixth edges 90, 92 are sealed along second horizontal seam 88 to provide the final sealed, packaged food product 82 as shown in FIG. 7. This process may be accomplished in automated fashion by use of a so-called vertical form, fill, and seal ("VFFS") or horizontal form, fill and seal ("HFFS") packaging machine. Such packaging machinery is commercially available from companies such as Robert Bosch Corporation of Bridgeman, Mich.

Those of skill in the art will appreciate that in the automated packaging of food products, a length of packaging film will generally be used to provide a plurality of food packages and the packages may be partially formed prior to being separated from one another.

Food products which may be packaged using the packaging film of the invention include snack chips, such as potato chips, corn chips, pretzels, confections, pet food and the like.

Advantageously, the invention allows extrusion coating and thermal lamination techniques to be used in complementary fashion with one another. A common base film, together with its extrusion coating may be mass-produced in large quantity by coextrusion coating techniques. Thus, for this portion of the packaging film manufacture, the speed and cost efficiencies of extrusion lamination techniques is achieved. The same base film and extrusion coating may then be utilized with multiple outer film layers. Relatively small production runs of outer film layers may each be printed with differing product packaging information. These printed outer layers may then each be separately combined with the common base layer material via thermal lamination. In the completion of these small production runs, thermal lamination provides greater flexibility than extrusion lamination as less time and material is wasted in changeover and setup between lamination production runs.

The following nonlimiting examples illustrate various additional aspects of the invention. Unless otherwise indicated, temperatures are in degrees Fahrenheit and percentages are by weight.

EXAMPLES 1 & 2

Two packaging films were produced by thermal lamination of a reverse printed outer layer film to a base layer film having a layer extrusion coating thereon.

For the first packaging film, the outer layer was a 70 gauge (0.7 mil) biaxially oriented polypropylene (BOPP) film having a width of 42 inches. The base layer was a clear 60 gauge (0.6 mil) OPP film having a width of 41 inches and having 0.6 mil thick extrusion coating of a 16% EVA extrudate.

For the second packaging film, the outer layer film was a 70 gauge (0.7 mil) biaxially oriented polypropylene (BOPP) film having a width of 37 inches. The base layer was a metallized 60 gauge (0.6 mil) OPP film having a width of 36 inches and having 0.7 mil thick extrusion coating of a 16% EVA extrudate.

The printed outer layer film was laminated to the base film on its extrusion coated side using a thermal laminator. The thermal laminator was operated at a line speed of about 500 feet per minute. Lamination was accomplished by passing the two films through a nip in the thermal laminator formed by two nip rolls, one of which was a heated roll. Prior to passage through the nip, the printed outer film was preheated to a temperature of about 100° F. and the extrusion coated base film was preheated to a web temperature of about 150° F. At the nip the heated roll was maintained at a temperature of about 230° F.

Both of the packaging films were found to be of good quality having little or no curling, no visible surface defects, and to have a bond strength in excess of 50 grams/inch.

EXAMPLE 3

A packaging film was provided by thermal lamination of a reverse printed outer layer film to a base layer film having a layer extrusion coating thereon. For the outer layer film, a 70 gauge (0.7 mils)-biaxially oriented polypropylene (BOPP) film having a width of 37 inches was utilized. The outer layer film was reverse printed with the product packaging information which would be applied to a food packaging film.

A metallized biaxially oriented polypropylene (BOPP) film was used for the base layer having a thickness of 70 gauge (0.7 mils) and a width of 36 inches. Prior to the thermal lamination, the metallized side of the base layer OPP film was extrusion coated. The extrudate was a mixture of about 40%, by weight, 16% ethylene vinyl acetate copolymer (EVA) and about 60% by weight, low density polyethylene (LDPE). The EVA/LDPE extrudate layer had a thickness of about 0.7 mil.

These temperatures were found to be sufficient to soften the EVA/LDPE layer thereby allowing the printed outer layer BOPP film to be laminated to the base layer OPP film. After passage through the nip, the thermally laminated packaging film was passed over a chill roll maintained at about 55° F. to cool and resolidify the EVA/LDPE layer.

The printed outer layer film was laminated to the base film on its extrusion coated side using a thermal laminator. The thermal laminator was operated at a line speed of about 500 feet per minute. Lamination was accomplished by passing the two films through a nip in the thermal laminator formed by two nip rolls, one of which was a heated roll. Prior to passage through the nip, the printed outer film was preheated to a temperature of about 100° F. and the extrusion coated base film was preheated to a web temperature of about 150° F. At the nip the heated roll was maintained at a temperature of about 230° F.

The packaging film so produced was found to be of good quality having little or no curling, no visible surface defects, and making the film suitable for packaging applications.

Having now described various aspects of the invention and preferred embodiments thereof, it will be recognized by those of ordinary skill that numerous modifications, variations and substitutions may exist within the spirit and scope of the appended claims.

What is claimed is:

1. A method for making a packaged food product comprising:
   providing a packaging film base layer having a first side and a second side and comprised of one or more polymeric materials;
   providing a heat sealable layer adjacent the second side of the base layer;
   extrusion coating at least one layer of polymeric material onto the first side of the base layer;
   providing a packaging film outer layer having a first side and a second side and comprised of one or more polymeric materials, wherein at least one of the outer layer first and second sides is capable of being printed thereon;
   providing printed information adjacent at least a portion of at least the second side of the outer layer;
   thermally laminating at least a portion of the base layer to at least a portion of the outer layer to one another using a combination of heat and pressure so as to provide a food packaging film;
   providing a consumable food product;
   folding the film lengthwise and sealing it together substantially along and adjacent at least a portion of the first and second edges thereof with at least some material from the heat sealable layer contacting itself therealong so as to form an open ended, tube-like enclosure;
   inserting the food product into the tube-like enclosure; and
   sealing together opposite ends of the enclosure along and adjacent third, fourth, fifth and sixth edges of the film with at least some material from the heat sealable layer contacting itself therealong so as to seal the food product within the enclosure.

2. The method of claim 1, wherein the third and fourth edges are sealed together before the food product is inserted into the enclosure.

3. A packaged food product comprising:
   a consumable food product; and
   a thermal laminate food packaging film having
   a packaging film base layer having a first side and a second side and comprised of one or more polymeric materials;
   at least one layer of polymeric extrudate adjacent the first side of the base layer, the extrudate having a relatively low melting point in the range of from about 70° C. to about 150° C. at least in the portion of the layer defining its surface opposite the surface adjacent the base layer and the extrudate also providing a barrier to egress of food components through the film;
   a heat sealable layer adjacent the second side of the base layer; and
   a packaging film outer layer having a first side and a second side and comprised of one or more polymeric materials, wherein the outer layer includes selected packaging information printed adjacent at least a portion of its second side and wherein the outer layer second side is thermally laminated to the layer of polymeric extrudate using a combination of heat and pressure
   wherein the packaging film is folded lengthwise and sealed together substantially along and adjacent at least a portion of first and second edges thereof with at least some material from the heat sealable layer contacting itself therealong so as to form an open ended, tube-like enclosure and the food product is inserted into and sealed within the tube-like enclosure.

4. The packaged food product of claim 3 wherein the film has a bond strength of at lest about 300 grams per inch.

5. The packaged food product of claim 3, wherein the polymeric materials of the base layer and of the outer layer each comprises one or more polymeric layers including at least one polymer selected from the group consisting of polypropylene, polyethylene terephthalate, polyethylene, and nylon.

6. The packaged food product of claim 3, wherein the polymeric materials of the base layer and of the outer layer each comprises, in at least one of the at least one layers thereof, at least biaxially oriented polypropylene.

7. The packaged food product of claim 3, wherein the extrusion coating comprises at least a coextrudate with a first layer comprising an ethylene vinyl acetate copolymer adjacent the outer layer with a melting point ranging from about 70° C. to about 150° and a second layer comprising a low density polyethylene adjacent the base layer.

8. The packaged food product of claim 3, wherein the base layer film has a thickness of from about 8 to about 30 microns and wherein the outer layer film has a thickness of from about 8 to about 30 microns.

9. The packaged food product of claim 7, wherein the first layer comprises about 40% by weight of the coextrudate and the second layer comprises about 60% by weight of the coextrudate.

10. The packaged food product of claim 7, wherein the second layer has a melt index of at least about 7.

11. The packaged food product of claim 3, wherein the outer layer includes at least one layer containing an opacifier.

12. The packaged food product of claim 3, wherein the outer layer includes at least one substantially clear layer.

13. The packaged food product of claim 3, wherein the base layer is metallized.

* * * * *